US012528315B2

(12) United States Patent
Kidesaki

(10) Patent No.: US 12,528,315 B2
(45) Date of Patent: Jan. 20, 2026

(54) TIRE

(71) Applicant: The Yokohama Rubber Co., LTD., Tokyo (JP)

(72) Inventor: Takashi Kidesaki, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/040,088

(22) PCT Filed: Aug. 5, 2021

(86) PCT No.: PCT/JP2021/029179
§ 371 (c)(1),
(2) Date: Jan. 31, 2023

(87) PCT Pub. No.: WO2022/030599
PCT Pub. Date: Feb. 10, 2022

(65) Prior Publication Data
US 2023/0241924 A1 Aug. 3, 2023

(30) Foreign Application Priority Data
Aug. 5, 2020 (JP) .................... 2020-133001

(51) Int. Cl.
*B60C 11/12* (2006.01)
*B60C 11/03* (2006.01)
*B60C 11/13* (2006.01)

(52) U.S. Cl.
CPC ...... *B60C 11/0304* (2013.01); *B60C 11/1236* (2013.01); *B60C 11/1263* (2013.01);
(Continued)

(58) Field of Classification Search
CPC ............ B60C 11/1263; B60C 11/1236; B60C 11/0304; B60C 11/1369; B60C 2011/1213; B60C 2011/0348; B60C 2011/1254
See application file for complete search history.

(56) References Cited

U.S. PATENT DOCUMENTS

| 5,439,040 A | 8/1995 | Iwamura et al. |
| 2014/0137999 A1* | 5/2014 | Nishiwaki ........... B60C 11/0309 |
| | | 152/209.8 |
| 2019/0322140 A1* | 10/2019 | Nukushina .............. B60C 11/24 |

FOREIGN PATENT DOCUMENTS

| CN | 110072709 A | 7/2019 |
| EP | 0602971 A1 | 6/1994 |

(Continued)

OTHER PUBLICATIONS

Machine translation for Japan 2016-016713 (Year: 2024).*
(Continued)

*Primary Examiner* — Steven D Maki
(74) *Attorney, Agent, or Firm* — Thorpe North & Western

(57) ABSTRACT

A tire including, in a tread surface (12), a plurality of shoulder main grooves extending in a tire circumferential direction, a plurality of lug grooves (351) extending in a direction intersecting the shoulder main groove, and a plurality of blocks B defined by the shoulder main grooves and the lug grooves (351). The tread surface (12) of the block B includes circumferential narrow grooves (352) each extending in the tire circumferential direction and a plurality of sipes that are provided on both sides of the circumferential narrow grooves in a tire width direction so as to be separated from the circumferential narrow grooves (352) and are disposed side by side in the tire circumferential direction and extend in the tire width direction. The circumferential narrow groove (352) includes a shallow bottom portion (3521) and a deep bottom portion (3522) having different depths from the tread surface (12). The deep bottom portion (3522) has a depth from the tread surface (12) deeper than a depth of the shallow bottom portion (3521) and is provided in a central portion of the block B in the tire circumferential direction.

19 Claims, 6 Drawing Sheets

(52) U.S. Cl.
CPC ... *B60C 11/1369* (2013.01); *B60C 2011/0348* (2013.01); *B60C 2011/1213* (2013.01); *B60C 2011/1254* (2013.01)

(56) References Cited

FOREIGN PATENT DOCUMENTS

| | | | |
|---|---|---|---|
| JP | 2010-247708 A | | 11/2010 |
| JP | 2012-171591 A | | 9/2012 |
| JP | 2013-189128 A | | 9/2013 |
| JP | 2016-016713 A | * | 2/2016 |
| JP | 2018-034524 A | | 3/2018 |
| JP | 2018-134992 A | | 8/2018 |
| JP | 2018-203053 A | * | 12/2018 |
| WO | 2019/117145 A1 | | 6/2019 |
| WO | 2019/142508 A1 | | 7/2019 |

OTHER PUBLICATIONS

Machine translation for Japan 2018-203053 (Year: 2024).*
Extended European Search Report, dated Jul. 23, 2024 for European Application No. 21853460.

* cited by examiner

| | Conventional Example | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Length L of circumferential narrow groove (mm) | 20 | 20 | 20 | 20 | 20 | 20 | 20 | 20 | 20 | 20 | 20 | 20 | 20 |
| Presence of deep bottom portion | No | Yes | Yes | Yes | Yes | Yes | Yes | Yes | Yes | Yes | Yes | Yes | Yes |
| Depth da of shallow bottom portion (mm) | 0.4 | 0.4 | 3.0 | 1.5 | 1.5 | 1.5 | 1.5 | 1.5 | 1.5 | 0.5 | 1.5 | 1.5 | 1.5 |
| Depth db of deep bottom portion (mm) | - | 1.8 | 7.0 | 1.8 | 7.0 | 3.5 | 3.5 | 3.5 | 3.5 | 3.5 | 3.5 | 3.5 | 3.5 |
| Depth dc of sipe (mm) | 7.0 | 8.0 | 8.0 | 8.0 | 7.0 | 7.0 | 7.0 | 7.0 | 7.0 | 7.0 | 5.0 | 7.0 | 7.0 |
| da/dc | 0.06 | 0.05 | 0.38 | 0.19 | 0.21 | 0.21 | 0.21 | 0.21 | 0.21 | 0.07 | 0.30 | 0.21 | 0.21 |
| db/dc | - | 0.23 | 0.88 | 0.23 | 1.00 | 0.50 | 0.50 | 0.50 | 0.50 | 0.50 | 0.70 | 0.50 | 0.50 |
| Length Lb of deep bottom portion (mm) | - | 4.0 | 4.0 | 4.0 | 4.0 | 4.0 | 13.0 | 8.0 | 8.0 | 8.0 | 8.0 | 6.5 | 12.0 |
| Lb/L | - | 0.20 | 0.20 | 0.20 | 0.20 | 0.20 | 0.65 | 0.40 | 0.40 | 0.40 | 0.40 | 0.33 | 0.60 |
| Presence of opening of at least one end of circumferential narrow groove to lug groove | No | No | No | No | No | No | No | No | Yes | Yes | Yes | Yes | Yes |
| Load durability performance (index value) | 100 | 102 | 101 | 103 | 102 | 104 | 102 | 105 | 105 | 106 | 105 | 105 | 104 |
| Wet braking performance (index value) | 100 | 102 | 104 | 103 | 105 | 104 | 107 | 106 | 107 | 106 | 106 | 107 | 108 |

FIG. 6

TIRE

TECHNICAL FIELD

The present technology relates to a tire and particularly relates to a tire in which a plurality of sipes are disposed on a tread surface.

BACKGROUND ART

In recent years, studless tires have been required to provide performance on snow and performance on ice in a compatible manner. In this type of studless tire, in order to improve performance on ice, a plurality of sipes are disposed on the tread surface of the land portion, and the sipes in the same block are disposed separated (divided) in the tire width direction so that the block rigidity is ensured and snow or ice clogging in the sipe is prevented.

On the other hand, in the configuration described above, there is a problem in that the ground contact pressure increases locally in a portion where the sipes are separated in the tire width direction, degrading the load durability performance. Therefore, a known configuration is proposed in which a circumferential groove extending in the tire circumferential direction is provided in the portion where the sipes are separated in the tire width direction (for example, see Japan Unexamined Patent Publication No. 2018-34524 A).

Incidentally, in tires where sipes in the same block are disposed so as to be separated in the tire width direction, there is room for further improvement for load durability performance and drainage performance.

SUMMARY

The present technology provides a tire with improved load durability performance and drainage performance.

A tire according to the present technology includes, in a tread portion, a plurality of circumferential main grooves extending in a tire circumferential direction; a plurality of lug grooves extending in a direction intersecting the circumferential main grooves; and a plurality of blocks defined by the circumferential main grooves and the lug grooves, a tread surface of the block including circumferential narrow grooves each extending in the tire circumferential direction and a plurality of sipes that are provided on both sides of the circumferential narrow grooves in a tire width direction and are separated from the circumferential narrow grooves, the plurality of sipes being disposed side by side in the tire circumferential direction and extending in the tire width direction, the circumferential narrow groove including a shallow bottom portion and a deep bottom portion having different depths from the tread surface, and the deep bottom portion having a depth from the tread surface deeper than a depth of the shallow bottom portion and being provided in a central portion of the block in the tire circumferential direction.

In the tire described above, the shallow bottom portion is preferably provided at each of both end portions of the circumferential narrow groove.

In the tire described above, a depth da of the shallow bottom portion, a depth db of the deep bottom portion, and a maximum depth dc of the sipe preferably satisfy the relationship da<db<dc.

Additionally, in the tire described above, the depth da of the shallow bottom portion and the maximum depth dc of the sipe preferably satisfy $0.06 \leq da/dc \leq 0.30$.

Moreover, in the tire described above, the depth db of the deep bottom portion and the maximum depth dc of the sipe preferably satisfy $0.25 \leq db/dc \leq 0.80$.

Further, in the tire described above, in the block, a circumferential length L of the circumferential narrow groove and a circumferential length Lb of the deep bottom portion preferably satisfy $0.30 \leq Lb/L \leq 0.60$.

Additionally, in the tire described above, in the block, the circumferential length L of the circumferential narrow groove and a circumferential length La of the shallow bottom portion satisfy $0.20 \leq La/L \leq 0.35$.

Furthermore, in the tire described above, the circumferential narrow groove preferably has a stepped groove-like shape having a bent portion between the shallow bottom portion and the deep bottom portion.

Additionally, in the tire described above, at least one end of the circumferential narrow groove is preferably open to the lug groove.

Moreover, in the tire described above, the circumferential narrow groove is preferably provided in a plurality of shoulder blocks provided side by side in the tire circumferential direction on the outermost side in the tire width direction.

The tire according to an embodiment of the present technology can improve the load durability performance and the drainage performance.

BRIEF DESCRIPTION OF DRAWINGS

FIG. 6 is a table indicating the results of performance tests of pneumatic tires.

DETAILED DESCRIPTION

Embodiments of the present technology will be described in detail below with reference to the drawings. However, the present technology is not limited to the embodiment. Constituents of the embodiment include elements that are essentially identical or that can be substituted or easily conceived by one skilled in the art.

A pneumatic tire according to the present embodiment will be described. In the following description, a tire radial direction refers to a direction orthogonal to a rotation axis of the tire, an inner side in the tire radial direction refers to a side toward the rotation axis in the tire radial direction, and an outer side in the tire radial direction refers to a side away from the rotation axis in the tire radial direction. In addition, a tire circumferential direction refers to a circumferential direction about the rotation axis as a center axis. Moreover, a tire width direction refers to a direction parallel to the rotation axis, an inner side in the tire width direction refers to a side toward a tire equatorial plane (tire equator line) in the tire width direction, and an outer side in the tire width direction refers to a side away from the tire equatorial plane in the tire width direction. Note that "tire equatorial plane"

refers to the plane orthogonal to the rotation axis of the pneumatic tire, the plane passing through the center of the tire width.

Figure 1:
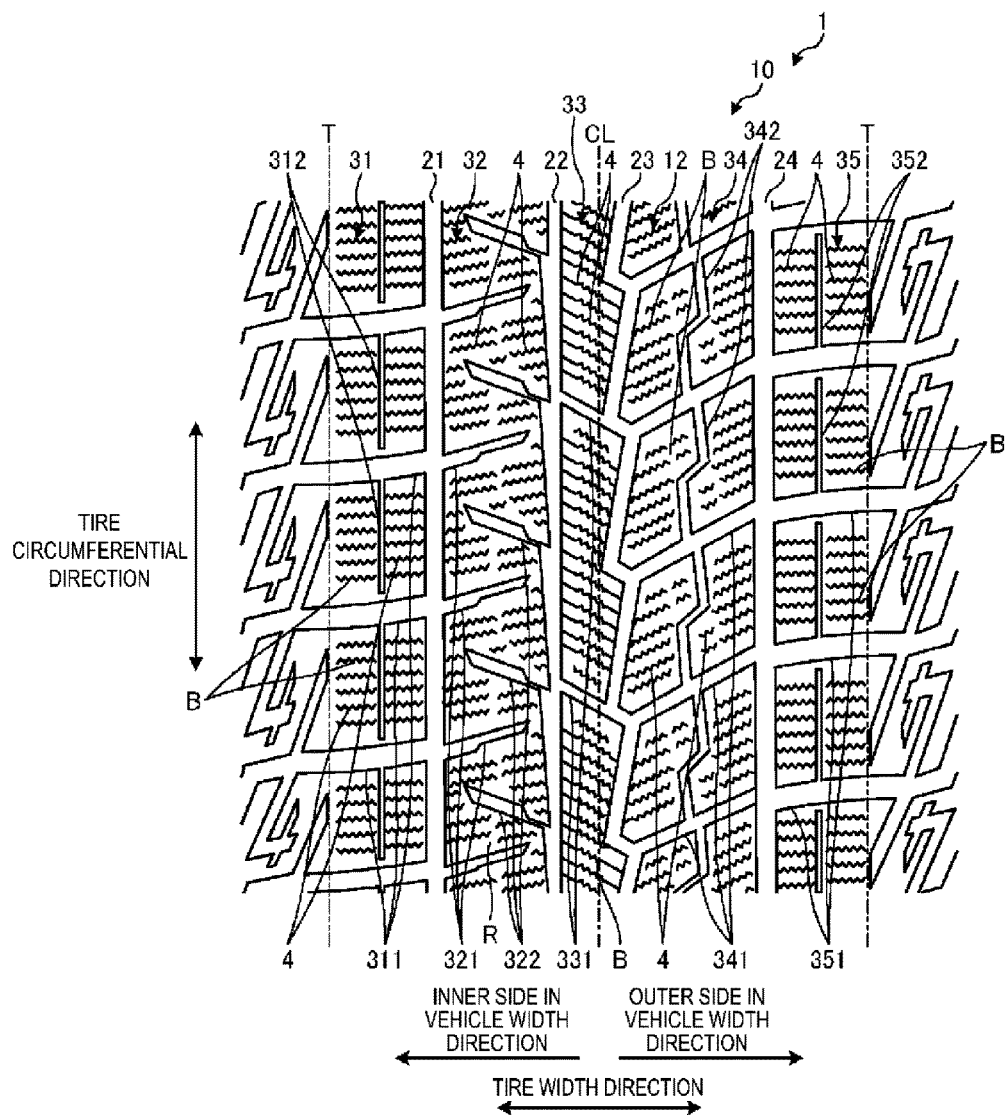
FIG. 1 is a plan view illustrating a tread surface of a pneumatic tire according to the present embodiment.

FIG. 1 is a plan view of a tread surface of the pneumatic tire according to the present embodiment. In FIG. 1, a reference sign CL denotes the tire equatorial plane, and reference signs T denote tire ground contact edges, respectively. Additionally, a pneumatic tire 1 according to the present embodiment (hereinafter, also referred to simply as "tire 1") is specified in the mounting direction with respect to the vehicle, and in the example of FIG. 1, it has a left-right asymmetric tread pattern centered on the tire equatorial plane CL. Note that in FIG. 1, the region illustrated on the outer side in the tire width direction of the ground contact edge T includes a so-called sidewall portion.

The ground contact edge T is defined as a maximum width position in the tire axial direction of the contact surface between the tire 1 and a flat plate when the tire 1 is mounted on a specified rim, inflated to a specified internal pressure, placed perpendicular to the flat plate in a static state, and loaded with a load corresponding to a specified load.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, the specified internal pressure refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. Additionally, the specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in the case of JATMA, for a tire for a passenger vehicle, the specified internal pressure is an air pressure of 180 kPa, and the specified load is 88% of the maximum load capacity.

A tread portion 10 of the tire 1 is made of a rubber material (tread rubber) and is exposed on the outermost side of the tire 1 in the tire radial direction, with the surface thereof constituting the contour of the tire 1. The surface of the tread portion 10 forms a tread surface 12 that is a surface that comes into contact with the road surface when a vehicle (not illustrated) on which the tire 1 is mounted is driven.

The tire 1 includes, in the tread surface 12, a plurality of circumferential main grooves 21 to 24 extending in the tire circumferential direction, a plurality of land portions 31 to 35 defined by the circumferential main grooves 21 to 24, a plurality of lug grooves 311, 321, 322, 331, 341, and 351 disposed in each of the land portions 31 to 35, and a plurality of sipes 4 disposed in each of the land portions 31 to 35. Here, "circumferential main groove" refers to a groove extending in the tire circumferential direction on which a wear indicator must be provided as specified by JATMA and typically has a groove width of 5.0 mm or more and a groove depth of 6.5 mm or more. "Lug groove" refers to a lateral groove extending in a direction intersecting the circumferential main groove (tire width direction) and typically having a groove width of 1.0 mm or more and a groove depth of 3.0 mm or more. Further, "sipe" refers to a cut formed in the tread surface and typically has a sipe width of less than 1.0 mm and a sipe depth of 2.0 mm or more, so that the sipe closes when the tire comes into contact with the ground.

Accordingly, the tire 1 of the present embodiment is configured as a studless tire provided with the sipe 4 on the tread surface 12.

A plurality (four in FIG. 1) of circumferential main grooves 21 to 24 that extend in the tire circumferential direction are provided on the tread surface 12 at predetermined intervals in the tire width direction respectively. In the present embodiment, with the tire equatorial plane CL as the boundary, two circumferential main grooves 21, 22 are provided on the inner side in the vehicle width direction, and two circumferential main grooves 23, 24 are provided on the outer side in the vehicle width direction, respectively, as illustrated in FIG. 1. Here, the inner side in the vehicle width direction and the outer side in the vehicle width direction are specified as orientations with respect to the vehicle width direction when the tire 1 is mounted on the vehicle. Additionally, two circumferential main grooves 21, 24 on the outermost side in the tire width direction are defined as shoulder main grooves, and two circumferential main grooves 22, 23 on the inner side in the tire width direction are defined as center main grooves.

In the example of FIG. 1, the shoulder main grooves 21, 24 each have straight shapes. In contrast, the center main grooves 22, 23 oscillate in the tire width direction while extending in the tire circumferential direction to form zigzag shapes. In particular, the center main groove 22 on the inner side in the vehicle width direction has a zigzag shape that the groove wall on the tire equatorial plane CL side has a straight shape, while the groove wall on the ground contact edge T side oscillates in the tire width direction while extending in the tire circumferential direction. Note that the number of circumferential main grooves is not limited to the above, and three or five or more circumferential main grooves may be disposed on the tread surface 12.

A plurality of (five in FIG. 1) land portions 31 to 35 extending in the tire circumferential direction are defined and formed by the four circumferential main grooves 21 to 24 on the tread surface 12. In the present embodiment, the land portions 31, 35 defined on the outer side in the tire width direction by the shoulder main grooves 21, 24 respectively are defined as shoulder land portions. Furthermore, the land portions 32, 34 defined on the inner side in the tire width direction by the shoulder main grooves 21, 24 are defined as second land portions. The second land portions 32, 34 are adjacent to the shoulder land portions 31, 35 with the above-described circumferential main grooves 21, 24 disposed respectively therebetween. Additionally, a land portion 33 defined between the center main grooves 22, 23 is defined as a center land portion. The center land portion 33 is provided extending on the tire equatorial plane CL.

Note that in the example of FIG. 1, only the single center land portion 33 exists, but in a configuration with five or more circumferential main grooves, a plurality of center land portions are formed. Furthermore, in a configuration with three circumferential main grooves, the center land portion may also serve as the second land portion.

The left and right shoulder land portions 31, 35 include a plurality of lug grooves 311, 351, respectively. Each of the lug grooves 311, 351 has one end opening to the shoulder main grooves 21, 24, respectively, and extends in the outer side in the tire width direction, and has an other end opening in a region across the ground contact edge T. A plurality of lug grooves 311, 351 are provided repeatedly in the tire circumferential direction in the shoulder land portions 31, 35, respectively. Accordingly, the shoulder land portions 31, 35 are partitioned into a plurality of blocks B (shoulder blocks) by the lug grooves 311, 351, respectively. The blocks B include circumferential narrow grooves 312, 352 each extending in the tire circumferential direction, and a plurality of sipes 4 extending in the tire width direction. In the example of FIG. 1, the circumferential narrow grooves 312, 352 are formed in a straight shape.

Additionally, the second land portion 32 on the inner side in the vehicle width direction includes two types and a plurality of lug grooves 321, 322, and a plurality of sipes 4 extending in the tire width direction. The lug groove 321 (first lug groove) has one end facing one end of the above-mentioned lug groove 311 and opening to the shoulder main groove 21, and an other end terminating inside the second land portion 32. Further, the lug groove 322 (second lug groove) has one end opening to the center main groove 22 and an other end terminating inside the second land portion 32. In the example of FIG. 1, one end of the lug groove 322 opens to a corner portion of the center main groove 22 having a zigzag shape that projects on the ground contact edge T side. Therefore, the lug grooves 321, 322 have a semi-closed structure that does not cross the second land portion 32. Additionally, the lug grooves 321, 322 are disposed in a staggered manner (alternately) in the tire circumferential direction, and each extend so as to be inclined in opposite directions with respect to the tire circumferential direction, and overlap each other in the tire width direction. Accordingly, the second land portion 32 is formed as a rib R that is continuous in the tire circumferential direction without being divided in the tire circumferential direction by the lug grooves 321, 322.

The center land portion 33 includes a plurality of lug grooves 331. The lug groove 331 is formed extending in the tire width direction between the two center main grooves 22, 23, and both end portions are open to the center main grooves 22, 23, respectively. In the example of in FIG. 1, one end of the lug groove 331 opens to a corner portion projecting on the tire equatorial plane CL side in the zigzag-shaped center main groove 23, and extends along the extension direction of the short portion of the center main groove 23. Further, the lug groove 331 is provided with respect to every other corner portion that forms the zigzag of the center main groove 23. The center land portion 33 is partitioned into a plurality of blocks B by a plurality of lug grooves 331, and a plurality of sipes 4 extending in the tire width direction are provided in each block B.

The second land portion 34 on the outer side in the vehicle width direction includes a plurality of lug grooves 341. The lug groove 341 is formed extending in the tire width direction between the adjacent center main groove 23 and a shoulder main groove 24, and one end opens to the center main groove 23, and an other end opens to the shoulder main groove 24. In the example of FIG. 1, one end of the lug groove 341 opens to a corner portion projecting on the ground contact edge T side of the zigzag-shaped center main groove 23, and an other end opens to the shoulder main groove 24 facing one end of the lug groove 351 described above. The second land portion 34 is partitioned into a plurality of blocks B by a plurality of lug grooves 341. The blocks B include a circumferential narrow groove 342 and a plurality of sipes 4 each extending in the tire width direction. In the example of FIG. 1, the circumferential narrow groove 342 is formed in a zigzag shape that oscillates in the tire width direction while extending in the tire circumferential direction.

Note that the pneumatic tire 1 according to the present embodiment has a meridian cross-section shape similar to that of a known pneumatic tire. Here, the meridian cross-section form of the pneumatic tire refers to the cross-sectional shape of the pneumatic tire as it appears on a plane normal to the tire equatorial plane CL. The tire 1 according to the present embodiment has a bead portion, a sidewall portion, a shoulder portion, and a tread portion 10 from the inner side to the outer side in the tire radial direction in a tire meridian cross-sectional view, not illustrated. Further, in the tire meridian cross-sectional view, for example, the tire 1 includes a carcass layer extending from the tread portion 10 to the bead portions on both sides and wound around a pair of bead cores, and a belt layer and a belt reinforcing layer provided in that order on the above-described carcass layer on the outer side in the tire radial direction.

Figure 2:
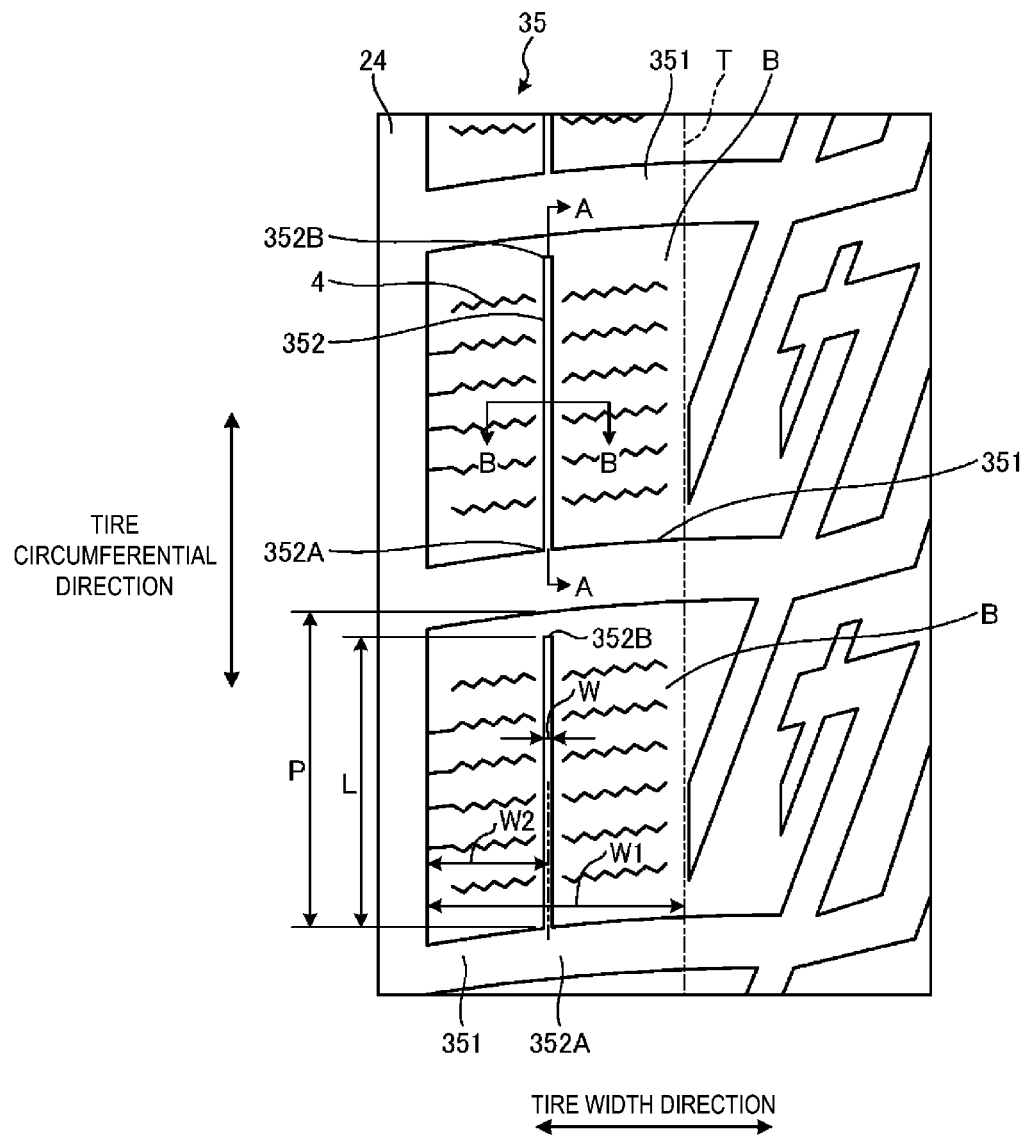
FIG. 2 is a plan view illustrating a shoulder land portion of the tread pattern illustrated in FIG. 1.
Figure 3:
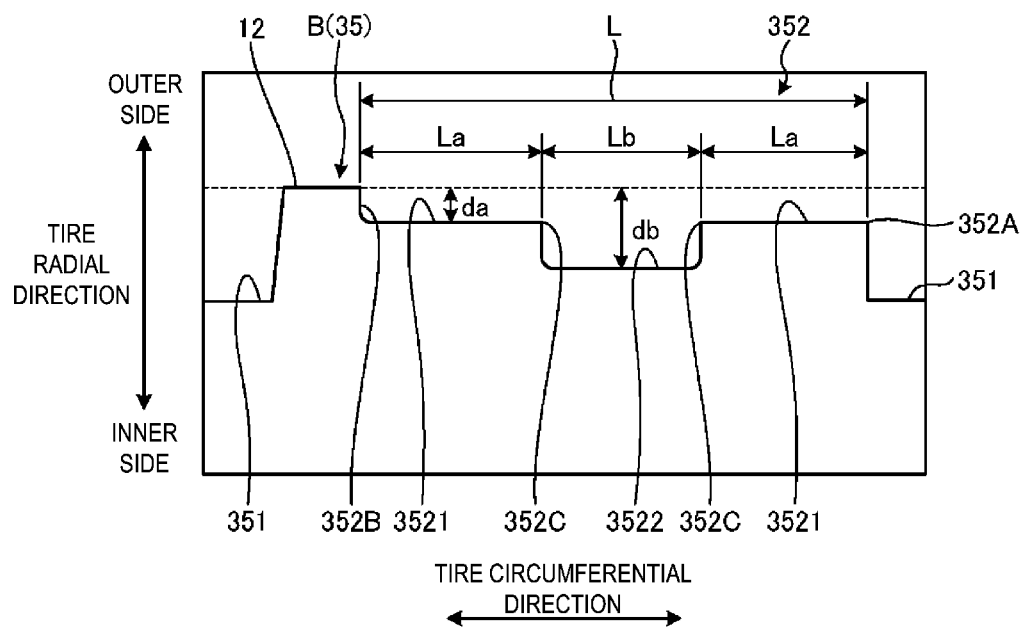
FIG. 3 is a cross-sectional view taken along A-A of FIG. 2.
Figure 4:
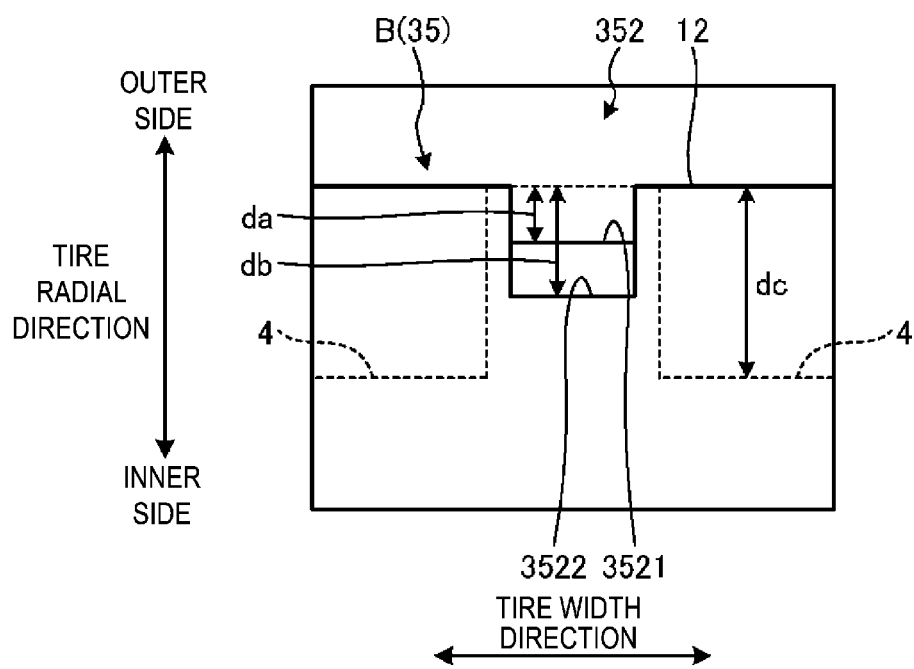
FIG. 4 is a cross-sectional view taken along B-B of FIG. 2.

Next, the tread pattern formed in the shoulder land portion is described in detail. FIG. 2 is a plan view illustrating a shoulder land portion of the tread pattern illustrated in FIG. 1. FIG. 3 is a cross-sectional view taken along line A-A of FIG. 2. FIG. 4 is a cross-sectional view taken along line B-B of FIG. 2. In FIGS. 2 to 4, a part of the shoulder land portion on the outer side in the vehicle width direction is illustrated, and the same configuration is also provided in the shoulder land portion on the inner side in the vehicle width direction. As described above, the left and right shoulder land portions 31, 35 located on the outermost side in the tire width direction are partitioned into a plurality of blocks B by a plurality of lug grooves 311, 351, respectively. The blocks B include the circumferential narrow grooves 312, 352 each extending in the tire circumferential direction, and the plurality of sipes 4 provided on both sides of the circumferential narrow grooves 312, 352 in the tire width direction.

As shown in FIG. 2, the plurality of sipes 4 extend along the tire width direction and are provided side by side in the tire circumferential direction. Each of the sipes 4 is separated from the circumferential narrow groove 352 and extends in the tire width direction without intersecting the circumferential narrow groove 352. Sipe 4 refers to a groove having, for example, a groove width of 0.3 mm or more and less than 1.0 mm and a groove depth of 5.0 mm or more and 8.0 mm or less. Additionally, the sipe 4 is formed in a zigzag shape in which an opening portion to the tread surface 12 is continuously bent a plurally of times. In this case, the sipe 4 may be a two-dimensional sipe, in which the shape of the tread portion 10 from the tread surface 12 toward the inner side in the tire radial direction is a zigzag shape along the zigzag shape of the tread surface 12, or may be a three-dimensional sipe bent further in addition to the zigzag shape. Additionally, the sipes 4 do not communicate with the circumferential narrow groove 352, but there is a configuration in which the sipes 4 communicate with the shoulder main groove 24 and a configuration in which the sipes 4 do not. According to this configuration, since the plurality of sipes 4 are disposed on the tread surface 12 so as to be separated (divided) in the tire width direction, the block rigidity is ensured and snow and ice clogging in the sipe 4 can be prevented. Therefore, it is possible to improve the performance on ice of the tire 1.

On the other hand, there is a problem in that in a portion where the above-described sipes 4 in the tread surface 12 are separated in the tire width direction, that is, in a region where the sipes are divided and not disposed, the ground contact pressure increases locally, degrading the load durability performance. Accordingly, in the present embodiment, the circumferential narrow groove 352 is provided in each block B. The circumferential narrow groove 352 is a narrow groove extending in the tire circumferential direction, and specifically, the groove width W is formed being 1.0 mm or more and 3.0 mm or less. Additionally, the circumferential narrow groove 352 is provided in a region where the sipes 4 that extend in the tire width direction are divided (separated) in the tire width direction, that is, in a central portion in the width direction of the shoulder land portion 35. Specifically, the width W1 of the shoulder land portion 35 specified by the distance between the edge of the shoulder main groove 24 and the ground contact edge T and the width W2 between the edge of the shoulder main groove 24 and the groove center line of the circumferential narrow groove 352 have a relationship $0.40 \leq W2/W1 \leq 0.60$. According to this configuration, by providing the circumferential narrow grooves 312, 352 in a region where the sipe 4 in the tread surface 12 is separated in the tire width direction, the ground contact pressure in each block B can be reduced, and the load durability performance can be improved. Additionally, in the configuration described above, the ground contact pressure in each block B is reduced by the circumferential narrow grooves 312, 352, and the ground contact pressure of the second land portions 32, 34 is relatively increased. Accordingly, the effect of improving the performance on ice and the performance on snow by the second land portions 32, 34 is efficiently obtained.

Additionally, at least one end 352A of the circumferential narrow groove 352 opens to the lug groove 351. In the example of FIG. 2, an other end 352B terminates inside the block B, while both ends 352A, 352B may open to the lug groove 351. In this case, preferably, the block length P on the extension line of the circumferential narrow groove 352 and the length L of the circumferential narrow groove 352 satisfy $0.85 \leq L/P \leq 1.0$, and satisfy $0.90 \leq L/P \leq 1.0$. According to this configuration, one end 352A opens to the lug groove 351, and the length L of the circumferential narrow groove 352 is 85% or more of the block length P, so that the load durability performance and the drainage performance can be improved.

Additionally, in this configuration, as illustrated in FIG. 3, the circumferential narrow groove 352 includes a shallow bottom portion 3521 and a deep bottom portion 3522 having different depths from the tread surface 12. The depth of the deep bottom portion 3522 from the tread surface 12 is formed deeper than the shallow bottom portion 3521. The circumferential narrow groove 352 is formed into a stepped groove-like shape having a bent portion 352C between the shallow bottom portion 3521 and the deep bottom portion 3522, the portion located on the outer side in the tire radial direction of the bent portion 352C being defined as the shallow bottom portion 3521, and the portion located on the inner side in the tire radial direction being defined as the deep bottom portion 3522. Therefore, the deep bottom portion 3522 is not limited to having a flat groove bottom, and may be U-shaped or V-shaped in a cross-sectional view, for example. Also, the shallow bottom portion 3521 may be inclined toward the bent portion 352C.

The depth da of the shallow bottom portion 3521 and the depth db of the deep bottom portion 3522 refer to the maximum depth from the tread surface 12 of the shallow bottom portion 3521 and the deep bottom portion 3522, respectively. The depth da of the shallow bottom portion 3521 and the depth db of the deep bottom portion 3522 satisfy the relationship $da<db<dc$ with the maximum depth dc of the sipe 4. By satisfying the above-described relationship, a decrease in block rigidity and clogging of snow and ice in the sipe 4 can be suppressed, which makes it possible to improve the performance on ice and the performance on snow of the tire 1. Additionally, satisfying the relationship described above allows for the load durability performance and the drainage performance of the tire 1 to be provided in a compatible manner. In the present embodiment, the shallow bottom portion 3521 is set to $0.5\ mm \leq da \leq 1.5\ mm$, and the deep bottom portion 3522 is set to $2.0\ mm \leq db \leq 4.0\ mm$. Further, the maximum depth de of the sipe 4 is set to $5.0\ mm \leq dc \leq 8.0\ mm$. Here, the depth da of the shallow bottom portion 3521 of the circumferential narrow groove 352 and the maximum depth dc of the sipe 4 preferably satisfy $0.06 \leq da/dc \leq 0.30$. When $da/dc<0.06$, the depth da of the shallow bottom portion 3521 is not sufficient, and the ground contact pressure increases locally, degrading the load durability performance. Further, when $da/dc>0.30$, the block rigidity decreases. In the present embodiment, the depth da of the shallow bottom portion 3521 and the maximum depth de of the sipe 4 satisfy $0.06 \leq da/dc \leq 0.30$, and thus the block rigidity can be maintained and the load durability performance can be improved.

Additionally, the depth db of the deep bottom portion 3522 of the circumferential narrow groove 352 and the maximum depth dc of the sipe 4 preferably satisfy $0.25 \leq db/dc \leq 0.80$. When $db/dc<0.25$, the ground contact pressure at the central portion in the tire circumferential direction of the block B where the deep bottom portion 3522 is formed cannot be sufficiently reduced, and the load durability performance degrades. The drainage performance through the circumferential narrow groove 352 decreases. Additionally, when $db/dc>0.80$, the rigidity of the block B decreases. In the present embodiment, the depth db of the deep bottom portion 3522 and the maximum depth dc of the sipe 4 satisfy $0.25 \leq db/dc \leq 0.80$, and thus the block rigidity can be maintained and the load durability performance and the drainage performance can be provided in a compatible manner.

Also, the shallow bottom portion 3521 is provided at both end portions in the tire circumferential direction of the circumferential narrow groove 352, and the deep bottom portion 3522 is provided in the central portion in the tire circumferential direction between both shallow bottom portions 3521. Specifically, the length La of each shallow bottom portion 3521 with respect to the length L of the circumferential narrow groove 352 satisfies $0.20 \leq La/L \leq 0.35$. The length La of the shallow bottom portion 3521 is the length from each end 352A, 352B to the bent portion 352C. According to this configuration, the deep bottom portion 3522 can be provided in the central portion of the block B, and thus the central portion in the tire circumferential direction where the ground contact pressure tends to concentrate in the block B can be relatively deep, a local increase in ground contact pressure can be suppressed, and the load durability performance can be effectively improved. Moreover, the circumferential narrow groove 352 includes the deep bottom portion 3522, and thus the drainage performance can be improved.

Further, the length Lb of the deep bottom portion 3522 with respect to the length L of the circumferential narrow groove 352 satisfies $0.30 \leq Lb/L \leq 0.60$. The length Lb of the deep bottom portion 3522 is the length between the bent portions 352C. Here, when $0.30>Lb/L$, the distance of the deep bottom portion 3522 is not sufficient, and sufficient effect on the drainage performance (wet performance) is not obtained. Furthermore, when $Lb/L>0.60$, the block rigidity decreases and the load durability performance degrades. According to this configuration, the length Lb of the deep bottom portion 3522 with respect to the length L of the circumferential narrow groove 352 satisfies the range described above, and thus the load durability performance and the drainage performance can be improved.

Note that the configuration of the circumferential narrow grooves 312, 352 and the sipes 4 included in each block B is best provided in the shoulder land portions 31, 35 (shoulder blocks) in terms of load durability performance and drainage performance, but the load durability performance and the drainage performance can also be improved even when it is provided in other land portions (blocks). For example, in the example of FIG. 1, each block of the second land portion 34 includes the circumferential narrow groove 342 and the sipe 4, and thus the central portion (short portion, for example) in the tire circumferential direction of the circumferential narrow groove 342 can be formed as the deep bottom portion described above.

Figure 5:
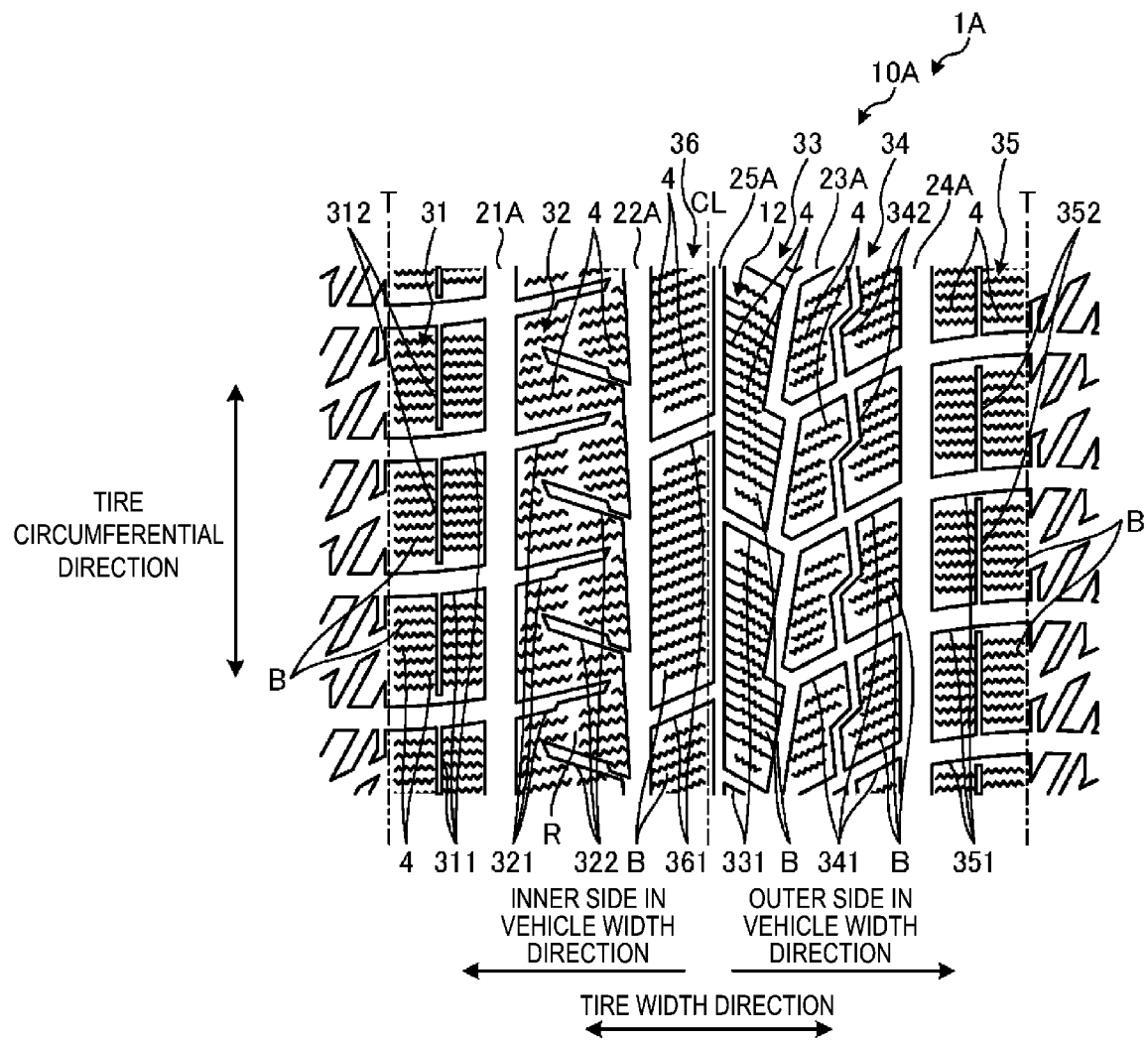
FIG. 5 is a plan view illustrating a tread surface of a pneumatic tire according to another embodiment.

Next, another embodiment will be described. FIG. 5 is a plan view illustrating a tread surface of a pneumatic tire according to another embodiment. Components that are the same as those of the above-described embodiment have the same reference sign and the description thereof is omitted. In the above-described embodiment, the tire 1 has a configuration including four circumferential main grooves 21 to 24 extending in the tire circumferential direction in the tread surface 12, but a difference in this another embodiment is that a pneumatic tire 1A (hereinafter referred to simply as the tire 1A) includes five circumferential main grooves 21A to 25A in the tread surface 12A.

Specifically, as illustrated in FIG. 5, with the tire equatorial plane CL as the boundary, two circumferential main grooves 21A, 22A are provided on the inner side in the vehicle width direction, and two circumferential main grooves 23A, 24A are provided on the outer side in the vehicle width direction, respectively, and one circumferential main groove 25A is provided on the tire equatorial plane CL. Similar to the embodiment described above, the circumferential main grooves 21A, 24A on the outermost side in the tire width direction are defined as the shoulder main grooves, and the circumferential main grooves 22A, 23A on the inner side in the tire width direction of the shoulder main groove are defined as the second main grooves. Furthermore, the circumferential main groove 25A is defined as the center main groove.

In this embodiment, six land portions 31 to 36 extending in the tire circumferential direction are defined and formed by the five circumferential main grooves 21A to 25A in the tread surface 12A. In this embodiment, the new center land portion 36 is formed in addition to the center land portion 33 by the two second main grooves 22A, 23A and the center main groove 25A. The center land portion 36 includes a plurality of lug grooves 361. The lug groove 361 is formed extending in the tire width direction between the second main groove 22A and the center main groove 25A, and both end portions are open to the second main groove 22A and the center main groove 25A, respectively. The center land portion 36 is partitioned into a plurality of blocks B by a plurality of lug grooves 361, and a plurality of sipes 4 extending in the tire width direction are provided in each block B.

Also in this another embodiment, the tread surface 12A of each block B provided in the shoulder land portions 31, 35 includes the circumferential narrow grooves 312, 352 each extending in the tire circumferential direction and a plurality of sipes 4 that are provided on both sides of the circumferential narrow grooves 312, 352 in the tire width direction so as to be separated from the circumferential narrow grooves 312, 352 and are disposed side by side in the tire circumferential direction and extend in the tire width direction, and the circumferential narrow grooves 312, 352 are each provided with the deep bottom portion whose depth from the tread surface 12A is deeper than that of the shallow bottom portion in the central portion of the block B in the tire circumferential direction, and thus the load durability performance and the drainage performance of the tire can be improved.

EXAMPLES

FIG. 6 is a table showing the results of performance tests of tires according to the present embodiment. In the performance tests, the (1) load durability performance and (2) wet braking performance as drainage performance were evaluated for a plurality of types of test tires. Furthermore, the test tires having a tire size of 195/65R15 91Q were assembled on specified rims having a rim size of 15×6.5 J, and a specified air pressure was applied to the test tires. Further, the test tires were mounted on all wheels of a test vehicle being a front-engine front-drive (FF) vehicle with an engine displacement of 1800 cc.

In the evaluation related to load durability performance, each tire was inflated to an air pressure of 180 kPa, and while a circumferential temperature was controlled at 38±3° C., the tire was loaded with a load equivalent to 88% of the maximum load (maximum load capacity) specified by JATMA and driven for 2 hours at a speed of 81 km/h, then the load was increased by 13% every two hours, and the running time when the tire broke was measured using an indoor drum testing machine (drum diameter: 1707 mm). On the basis of the measurement results, the evaluation is expressed as index values with the value of Conventional Example being assigned the reference 100. In the evaluation, larger index values indicate superior load durability performance.

In the method for evaluating wet braking performance, the above-described test vehicle mounted with test tires inflated to an air pressure of 250 kPa for the front tires and 240 kPa for the rear tires was driven on the test course on wet road surfaces, and the professional test driver performed a filling evaluation with respect to braking performance. The evaluation is expressed as index values with the value of the Conventional Example being defined as the reference 100. In the evaluation, larger index value indicates superior wet braking performance (drainage performance).

The performance evaluation tests were performed on 13 types of pneumatic tires including a tire according to Conventional Example as an example of a known tire, and Examples 1 to 12 corresponding to the tires 1 according to the present technology. All of these tires of Conventional Example and Examples 1 to 12 are provided with circumferential narrow grooves and sipes on the tread surface of the shoulder land portion. The groove width W of the circumferential narrow groove is set to 2.0 mm. Of these, in Conventional Example, the circumferential narrow groove is formed at a constant depth and includes no deep bottom portions.

In contrast, in all of Examples 1 to 12, which are examples of the tire according to the present technology, the circumferential narrow groove has the deep bottom portion, and the deep bottom portion is provided in the central portion in the tire circumferential direction of the block. Furthermore, the tires according to Examples 1 to 12 are each different in a ratio of the depth da of the shallow bottom portion with respect to the maximum depth dc of the sipe (da/dc), a ratio of the depth db of the deep bottom portion with respect to the maximum depth de of the sipe (db/dc), and a ratio of the circumferential length Lb of the deep bottom portion with respect to the circumferential length L of the circumferential narrow groove (Lb/L), and whether one end of the circumferential narrow groove is open to the lug groove.

As a result of performing the performance evaluation tests by using the tires 1, it was revealed as indicated in FIG. 6 that compared with Conventional Example, the tires according to Examples 1 to 12 improve load durability performance and wet braking performance (drainage performance). In other words, the tires according to Examples 1 to 12 can provide load durability performance and drainage performance in a compatible manner.

While the embodiments of the present technology have been described above, the present technology is not limited to the embodiments described above. For example, in the present embodiment, a pneumatic tire has been described as an example of a tire but is not limited to this, and the present embodiment can naturally be applied to a tire that is not filled with air, such as an airless tire. A gas to be filled in the pneumatic tire illustrated in the present embodiment may be an inert gas such as nitrogen, argon, and helium in addition to ordinary air or air with an adjusted oxygen partial pressure.

The invention claimed is:

1. A tire, comprising:
in a tread portion,
a plurality of circumferential main grooves extending in a tire circumferential direction;
a plurality of lug grooves extending in a direction intersecting the circumferential main grooves; and
a plurality of blocks defined by the circumferential main grooves and the lug grooves,
a tread surface of each of the blocks comprising a circumferential narrow groove extending in the tire circumferential direction and a plurality of sipes that are provided on both sides of the circumferential narrow groove in a tire width direction and are separated from the circumferential narrow groove, the plurality of sipes being disposed side by side in the tire circumferential direction and extending in the tire width direction,
the circumferential narrow groove comprising at least one shallow bottom portion and a deep bottom portion having different depths from the tread surface, and
the deep bottom portion having a depth from the tread surface deeper than a depth of the shallow bottom portion and being provided in a central portion of each of the blocks in the tire circumferential direction, wherein
in each of the blocks, a circumferential length L of the circumferential narrow groove and a circumferential length La of each shallow bottom portion of the at least one shallow bottom portion satisfy $0.20 \leq La/L \leq 0.35$, and
a depth db of the deep bottom portion and a maximum depth dc of the sipe satisfy $0.25 \leq db/dc \leq 0.70$.

2. The tire according to claim 1, wherein the at least one shallow bottom portion is provided at both end portions of the circumferential narrow groove.

3. The tire according to claim 2, wherein a depth da of the at least one shallow bottom portion, a depth db of the deep bottom portion, and a maximum depth dc of the sipe satisfy a relationship $da < db \leq dc$.

4. The tire according to claim 3, wherein a depth da of the at least one shallow bottom portion and a maximum depth dc of the sipe satisfy $0.06 \leq da/dc \leq 0.30$.

5. The tire according to claim 4, wherein, in each of the blocks, a circumferential length L of the circumferential narrow groove and a circumferential length Lb of the deep bottom portion satisfy $0.30 \leq Lb/L \leq 0.60$.

6. The tire according to claim 5, wherein the circumferential narrow groove has a stepped groove-like shape having a bent portion between the at least one shallow bottom portion and the deep bottom portion.

7. The tire according to claim 6, wherein the circumferential narrow groove comprises at least one end that opens to one of the lug grooves.

8. The tire according to claim 7, wherein the plurality of blocks in which the circumferential narrow groove is provided are a plurality of shoulder blocks provided side by side in the tire circumferential direction on outermost sides in the tire width direction.

9. The tire according to claim 1, wherein a depth da of the at least one shallow bottom portion, a depth db of the deep bottom portion, and a maximum depth dc of the sipe satisfy a relationship $da < db \leq dc$.

10. The tire according to claim 1, wherein a depth da of the at least one shallow bottom portion and a maximum depth dc of the sipe satisfy $0.06 \leq da/dc \leq 0.30$.

11. The tire according to claim 1, wherein, in each of the blocks, a circumferential length L of the circumferential narrow groove and a circumferential length Lb of the deep bottom portion satisfy $0.30 \leq Lb/L \leq 0.60$.

12. The tire according to claim 1, wherein the circumferential narrow groove has a stepped groove-like shape having a bent portion between the at least one shallow bottom portion and the deep bottom portion.

13. The tire according to claim 1, wherein the circumferential narrow groove comprises at least one end that opens to one of the lug grooves.

14. The tire according to claim 1, wherein the plurality of blocks in which the circumferential narrow groove is provided are a plurality of shoulder blocks provided side by side in the tire circumferential direction on outermost sides in the tire width direction.

15. A tire, comprising:
in a tread portion,
a plurality of circumferential main grooves extending in a tire circumferential direction;
a plurality of lug grooves extending in a direction intersecting the circumferential main grooves; and
a plurality of blocks defined by the circumferential main grooves and the lug grooves,
a tread surface of each of the blocks comprising a circumferential narrow groove extending in the tire circumferential direction and a plurality of sipes that are provided on both sides of the circumferential narrow groove in a tire width direction and are separated from the circumferential narrow groove, the plurality of sipes being disposed side by side in the tire circumferential direction and extending in the tire width direction,
the circumferential narrow groove comprising at least one shallow bottom portion and a deep bottom portion having different depths from the tread surface, and
the deep bottom portion having a depth from the tread surface deeper than a depth of the shallow bottom portion and being provided in a central portion of each of the blocks in the tire circumferential direction, wherein
the circumferential narrow groove comprises only one end that opens to one of the lug grooves,
in each of the blocks, a circumferential length L of the circumferential narrow groove and a circumferential length La of each shallow bottom portion of the at least one shallow bottom portion satisfy $0.20 \leq La/L \leq 0.35$, and a depth db of the deep bottom portion and a maximum depth de of the sipe satisfy $0.25 \leq db/dc \leq 0.70$.

16. A tire, comprising:

in a tread portion, a plurality of circumferential main grooves extending in a tire circumferential direction;

a plurality of lug grooves extending in a direction intersecting the circumferential main grooves; and a plurality of blocks defined by the circumferential main grooves and the lug grooves, a tread surface of each of the blocks comprising a circumferential narrow groove extending in the tire circumferential direction and a plurality of sipes that are provided on both sides of the circumferential narrow groove in a tire width direction and are separated from the circumferential narrow groove, the plurality of sipes being disposed side by side in the tire circumferential direction and extending in the tire width direction, the circumferential narrow groove comprising a shallow bottom portion and a deep bottom portion having different depths from the tread surface, and the deep bottom portion having a depth from the tread surface deeper than a depth of the shallow bottom portion and being provided in a central portion of each of the blocks in the tire circumferential direction, wherein in each of the blocks, a circumferential length L of the circumferential narrow groove and a circumferential length La of the shallow bottom portion satisfy $0.20 \leq La/L \leq 0.35$, a depth db of the deep bottom portion and a maximum depth dc of the sipe satisfy $0.25 \leq db/dc \leq 0.70$, the shallow bottom portion is provided at both end portions of the circumferential narrow groove, and only a single of the deep bottom portions is provided between the shallow bottom portions.

17. A tire, comprising:

in a tread portion, a plurality of circumferential main grooves extending in a tire circumferential direction;

a plurality of lug grooves extending in a direction intersecting the circumferential main grooves; and a plurality of blocks defined by the circumferential main grooves and the lug grooves, a tread surface of each of the blocks comprising a circumferential narrow groove extending in the tire circumferential direction and a plurality of sipes that are provided on both sides of the circumferential narrow groove in a tire width direction and are separated from the circumferential narrow groove, the plurality of sipes being disposed side by side in the tire circumferential direction and extending in the tire width direction, the circumferential narrow groove comprising a shallow bottom portion and a deep bottom portion having different depths from the tread surface, and the deep bottom portion having a depth from the tread surface deeper than a depth of the shallow bottom portion and being provided in a central portion of each of the blocks in the tire circumferential direction, wherein the circumferential narrow groove comprises only one end that opens to one of the lug grooves, a depth db of the deep bottom portion and a maximum depth dc of the sipe satisfy $0.25 \leq db/dc \leq 0.70$, the shallow bottom portion is provided at both end portions of the circumferential narrow groove, and only a single of the deep bottom portions is provided between the shallow bottom portions.

18. A tire, comprising:

in a tread portion, a plurality of circumferential main grooves extending in a tire circumferential direction;

a plurality of lug grooves extending in a direction intersecting the circumferential main grooves; and a plurality of blocks defined by the circumferential main grooves and the lug grooves, a tread surface of each of the blocks comprising a circumferential narrow groove extending in the tire circumferential direction and a plurality of sipes that are provided on both sides of the circumferential narrow groove in a tire width direction and are separated from the circumferential narrow groove, the plurality of sipes being disposed side by side in the tire circumferential direction and extending in the tire width direction, the circumferential narrow groove comprising a shallow bottom portion and a deep bottom portion having different depths from the tread surface, and the deep bottom portion having a depth from the tread surface deeper than a depth of the shallow bottom portion and being provided in a central portion of each of the blocks in the tire circumferential direction, wherein in each of the blocks, a circumferential length L of the circumferential narrow groove and a circumferential length La of the shallow bottom portion satisfy $0.20 \leq La/L \leq 0.35$, a depth db of the deep bottom portion and a maximum depth dc of the sipe satisfy $0.25 \leq db/dc \leq 0.70$, and in each of the blocks, a circumferential length L of the circumferential narrow groove and a circumferential length Lb of only a single of the deep bottom portions satisfy $0.30 \leq Lb/L \leq 0.60$.

19. A tire, comprising:

in a tread portion, a plurality of circumferential main grooves extending in a tire circumferential direction;

a plurality of lug grooves extending in a direction intersecting the circumferential main grooves; and a plurality of blocks defined by the circumferential main grooves and the lug grooves, a tread surface of each of the blocks comprising a circumferential narrow groove extending in the tire circumferential direction and a plurality of sipes that are provided on both sides of the circumferential narrow groove in a tire width direction and are separated from the circumferential narrow groove, the plurality of sipes being disposed side by side in the tire circumferential direction and extending in the tire width direction, the circumferential narrow groove comprising a shallow bottom portion and a deep bottom portion having different depths from the tread surface, and the deep bottom portion having a depth from the tread surface deeper than a depth of the shallow bottom portion and being provided in a central portion of each of the blocks in the tire circumferential direction, wherein the circumferential narrow groove comprises only one end that opens to one of the lug grooves, a depth db of the deep bottom portion and a maximum depth dc of the sipe satisfy $0.25 \leq db/dc \leq 0.70$, and in each of the blocks, a circumferential length L of the circumferential narrow groove and a circumferential length Lb of only a single of the deep bottom portions satisfy $0.30 \leq Lb/L \leq 0.60$.

\* \* \* \* \*